Jan. 12, 1965   C. W. HAHN   3,165,230
DISPENSING APPARATUS FOR BUTTER AND THE LIKE
Filed Oct. 11, 1963   4 Sheets-Sheet 1
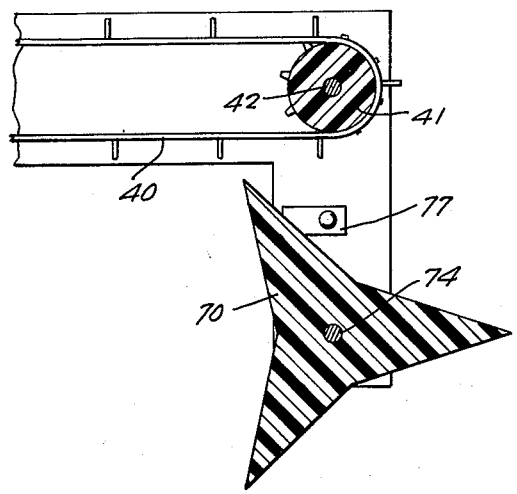
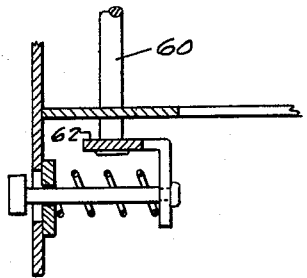
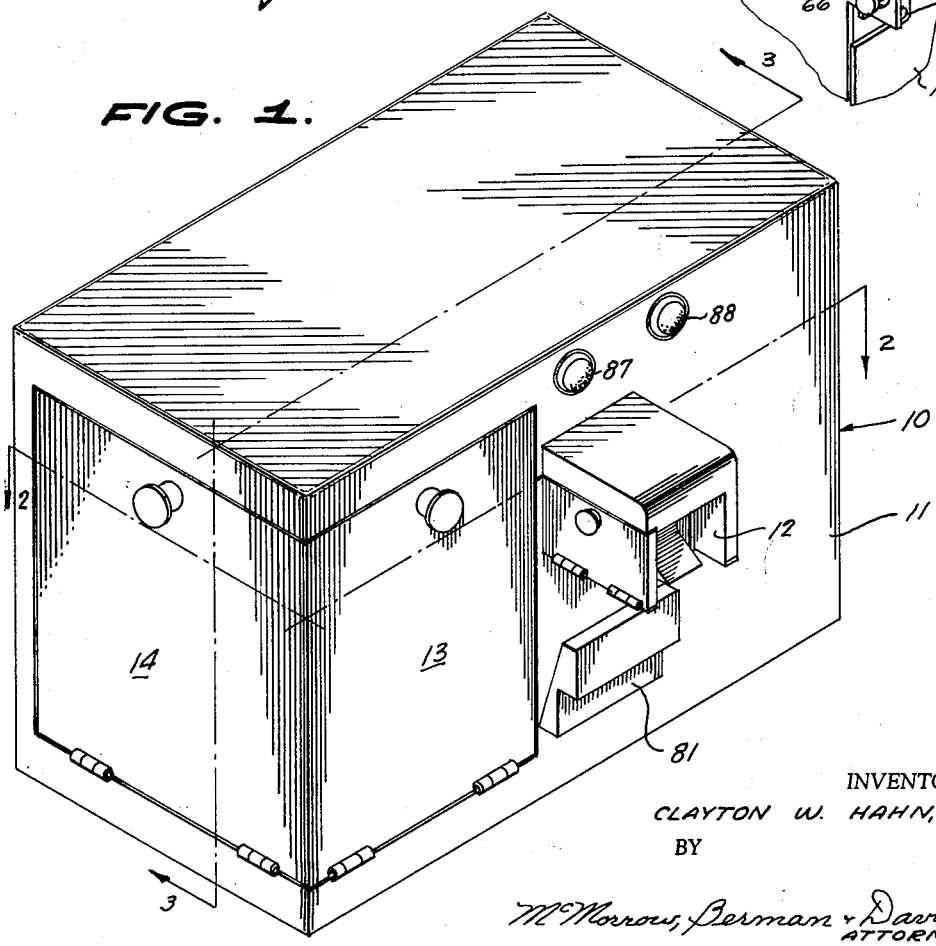
INVENTOR.
CLAYTON W. HAHN,
BY
McMorrow, Berman & Davidson
ATTORNEYS.

Jan. 12, 1965 C. W. HAHN 3,165,230
DISPENSING APPARATUS FOR BUTTER AND THE LIKE
Filed Oct. 11, 1963 4 Sheets-Sheet 2
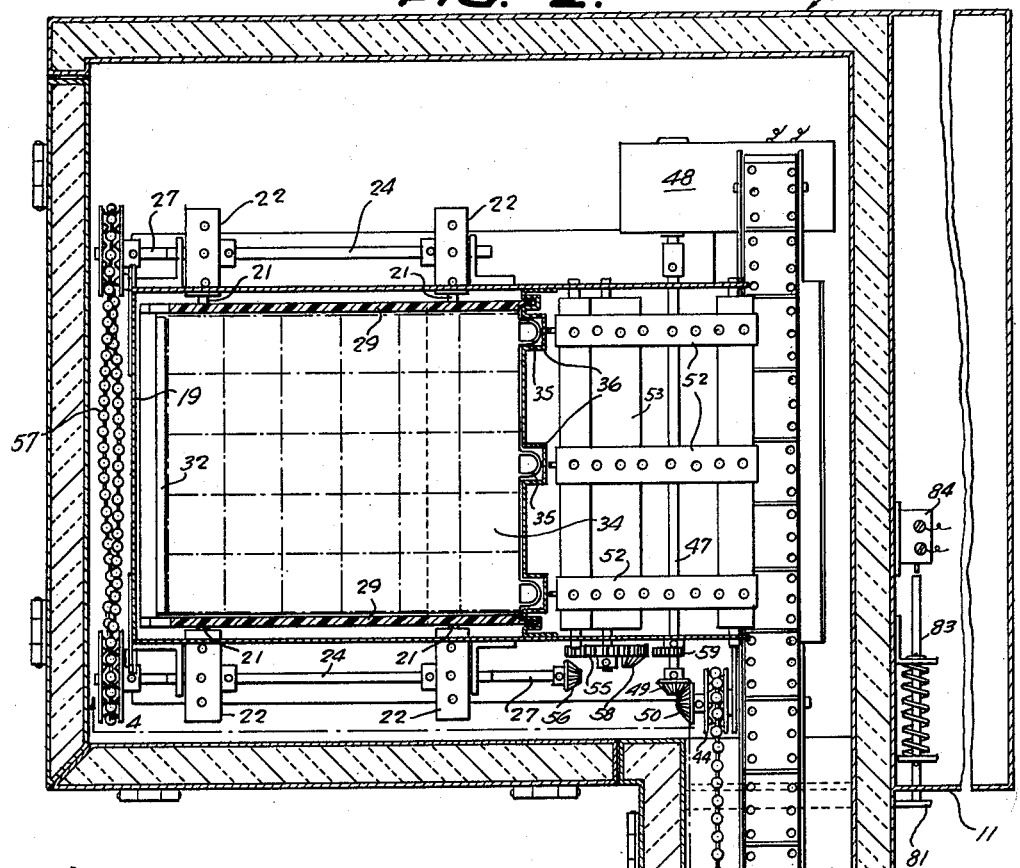
FIG. 2.
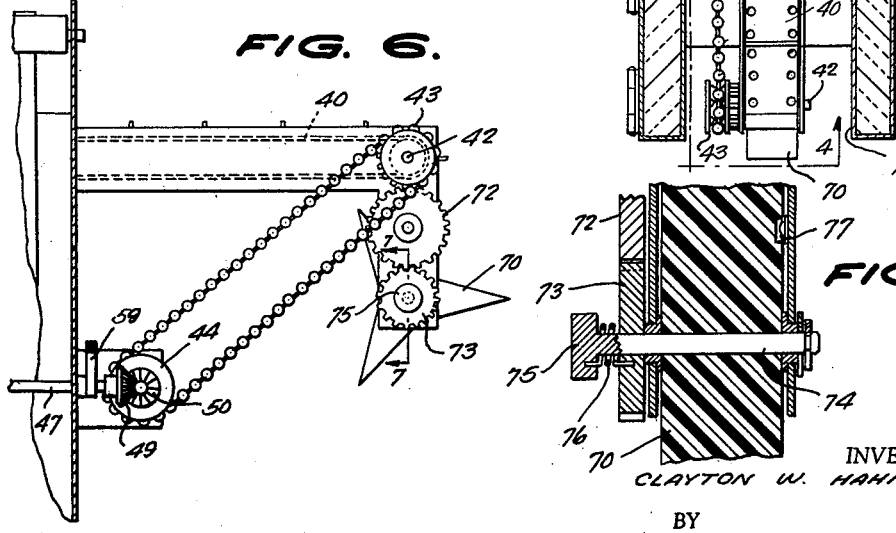
FIG. 6.
FIG. 7.
INVENTOR.
CLAYTON W. HAHN,
BY
McMorrow, Berman & Davidson
ATTORNEYS.

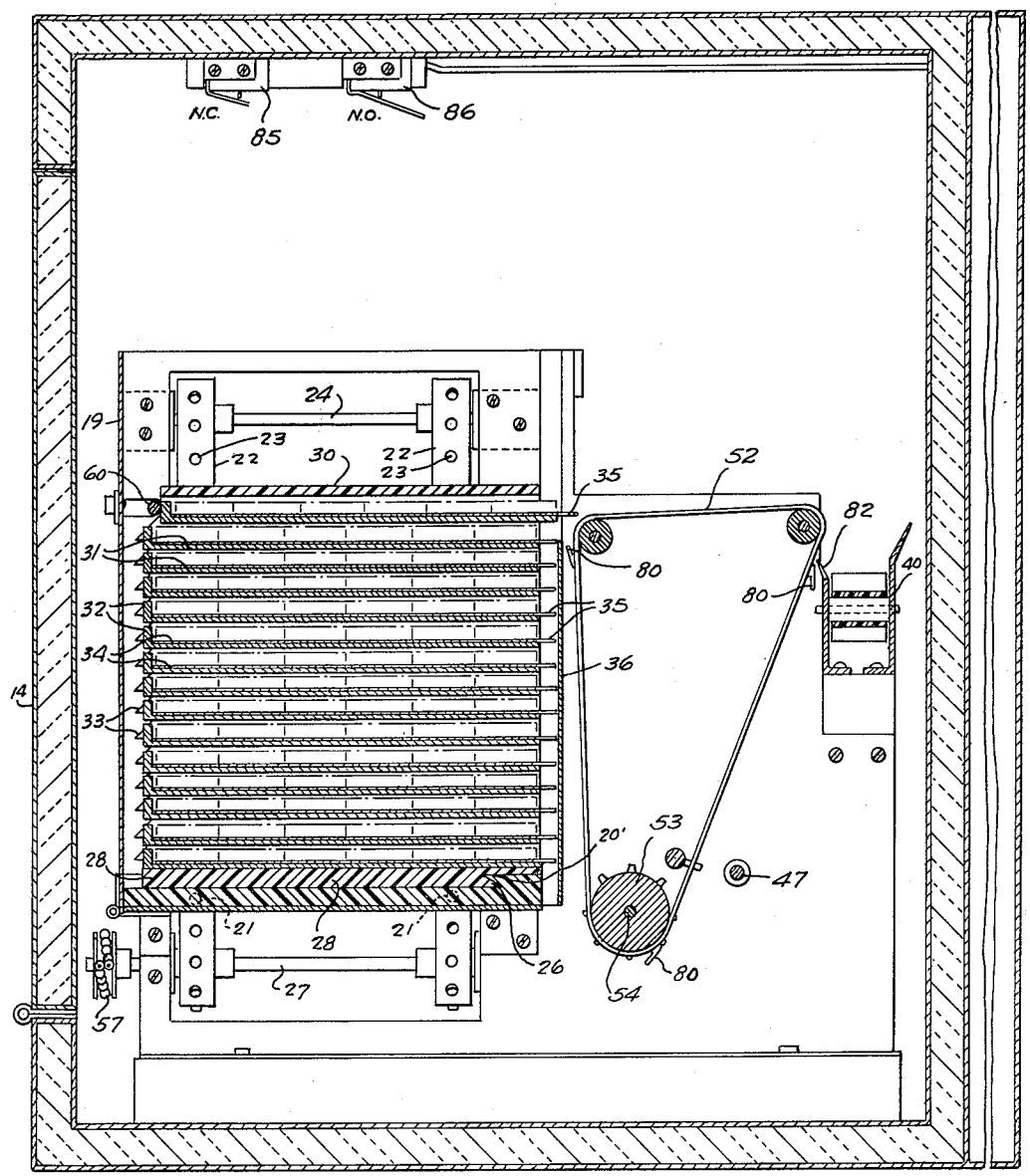
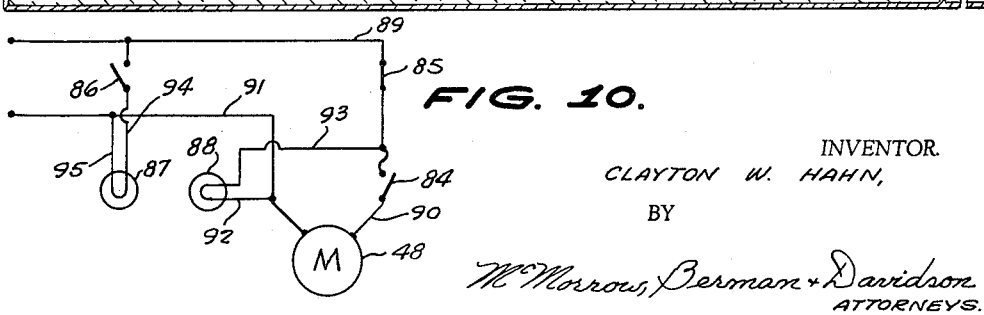

Jan. 12, 1965   C. W. HAHN   3,165,230
DISPENSING APPARATUS FOR BUTTER AND THE LIKE
Filed Oct. 11, 1963   4 Sheets-Sheet 4

INVENTOR.
CLAYTON W. HAHN,
BY
McMorrow, Berman & Davidson
ATTORNEYS.

_United States Patent Office_

3,165,230
Patented Jan. 12, 1965

3,165,230
DISPENSING APPARATUS FOR BUTTER
AND THE LIKE
Clayton W. Hahn, 1516 Sunrise Rim Road, Boise, Idaho
Filed Oct. 11, 1963, Ser. No. 315,621
8 Claims. (Cl. 221—73)

This invention relates to an apparatus for dispensing butter and the like.

An object of the present invention is to provide an apparatus for dispensing butter and the like wherein the butter and the like is handled in patty form, and is dispensed automatically after the apparatus is set in operation.

Another object of the present invention is to provide an apparatus for dispensing butter and the like which dispenses the butter and the like without requiring the use of tongs, forks, or like implements.

A further object of the present invention is to provide an apparatus for dispensing butter and the like which is highly efficient in action, and commercially feasible.

Other objects and advantages will become apparent from the following description taken in conjunction with the accompanying drawings, wherein:

FIGURE 1 is an isometric view of the dispensing apparatus according to the present invention.

FIGURE 2 is a horizontal sectional view taken on the line 2—2 of FIGURE 1.

FIGURE 3 is a vertical sectional view taken on the line 3—3 of FIGURE 1.

FIGURE 6 is a fragmentary sectional view taken on the line 6—6 of FIGURE 4.

FIGURE 7 is a fragmentary sectional view taken on the line 7—7 of FIGURE 6.

FIGURE 8 is a fragmentary sectional view taken on the line 8—8 of FIGURE 4.

FIGURE 9 is a sectional view taken on the line 9—9 of FIGURE 4.

FIGURE 10 is a diagrammatical showing of the electric circuit.

FIGURE 11 is a fragmentary isometric view of the pushing force applying means and the latching means on the frame housing the magazine.

Figure 4:
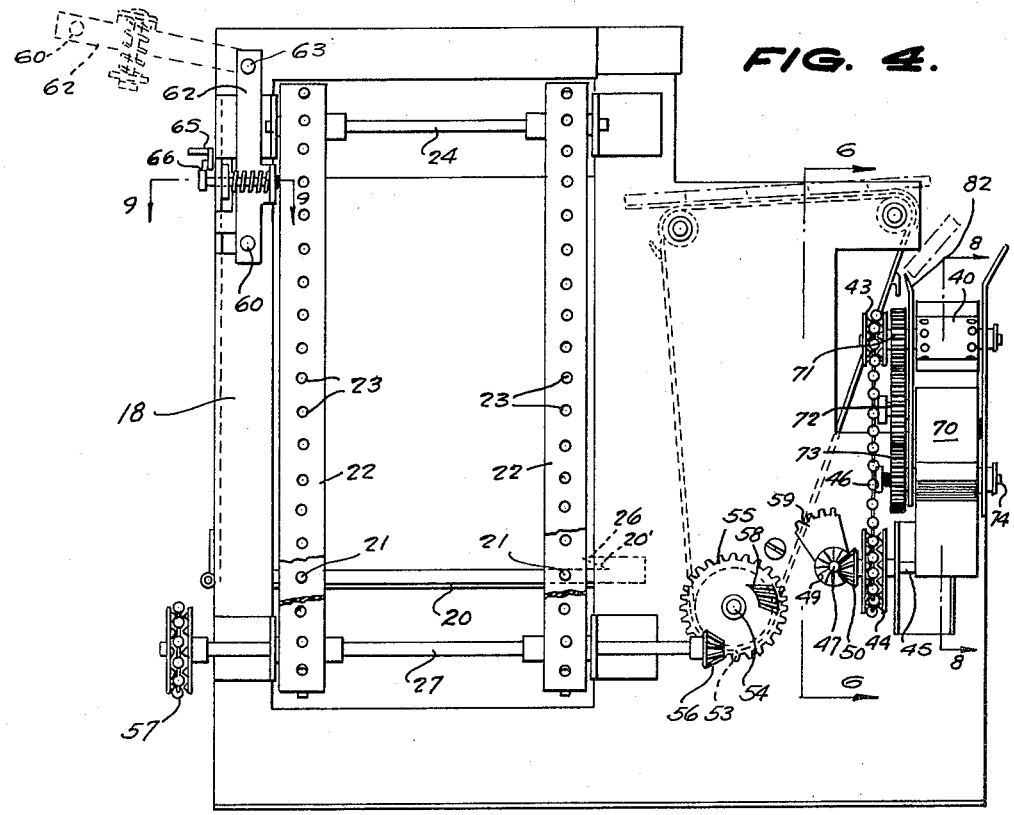
FIGURE 4 is a vertical view taken along the line 4—4 of FIGURE 2.
Figure 5:
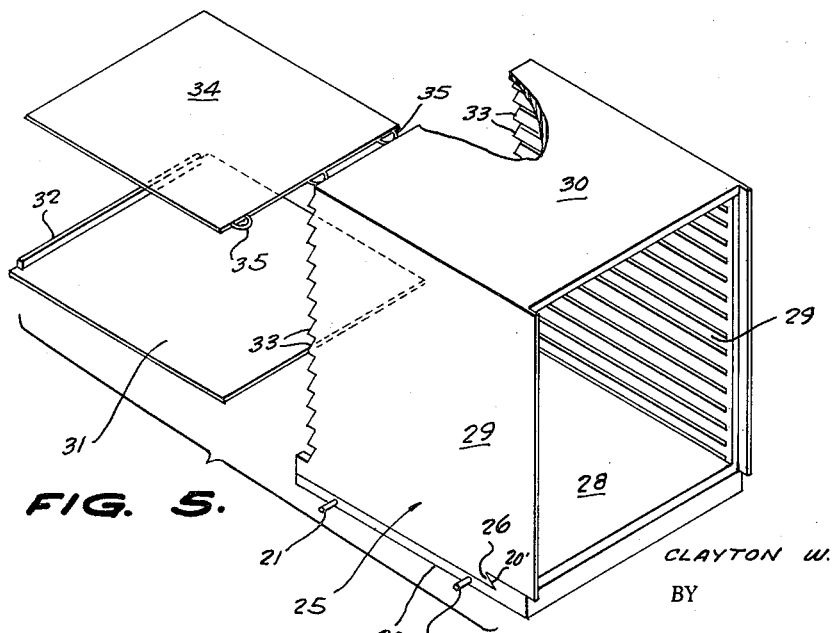
FIGURE 5 is an exploded perspective view, with a part broken away and in section, of the magazine of the apparatus according to the present invention.

Referring to the drawings, numeral 10 designates a refrigerated cabinet, the cabinet having a side wall 11 provided with an exit opening 12. The portion of the side wall 11 on one side of the exit opening 12 has an openable and closable door 13 for access to the interior of the cabinet 10, and also another openable and closable door 14 located in side-by-side relation with respect to the door 13 for access to the magazine contained in the cabinet.

Disposed within the cabinet 10 to one side of or in back of the door 13 and spaced from the exit opening 12 is an upstanding magazine 25 which is connected to the cabinet 10 for upward movement. Specifically, in the part of the cabinet 10 behind the doors 13 and 14 is an upstanding frame 18 which is rigidly supported in the cabinet 10. The frame is closed at one end by an openable and closable door 19. Mounted within the frame 18 is a follower 20, the follower being provided on its top with an angularly-shaped groove 20' which is inwardly of and adjacent to and extends along one end thereof. The follower 20 is disposed within the frame 18 so that the groove 20' faces toward and is remote from the door 19 and the other end is inwardly of and contiguous to the door 19. The follower 20 is connected to the frame 18 for upward movement therein by means of a pair of endless belts 22 arranged in vertical side-by-side spaced relation along each side of the follower 20, the follower carrying a pair of spaced pins 21 projecting from each side thereof which successively engage in sprocket holes 23 formed in the belts 22 of each pair and extending in spaced relation therearound. Each pair of belts 22 is rotatable about horizontally-disposed upper and lower driven shafts 24 and 27 respectively, carried by the frame 18.

The magazine 25 comprises a base 28, spaced side walls 29 rising from the base 28, and a top wall 30 extending over and attached to the upper ends of the side walls 29. The base 28 is provided with an angularly shaped groove 26 which extends along and inwardly of and adjacent one end thereof. The magazine 25 is positioned upon the follower 20 so that the base 28 rests upon the follower with its grooves 26 releasably mating with the groove 20' of the follower 20, the other end of the base being flush with the other end of the follower 20.

The ends of the side walls 29 of the magazine 25 adjacent the other end of the base 28 are formed with serrations 33 extending therealong which function in operation as cams, the purpose of which will be subsequently described.

Slidably supported upon the side walls 29 of the magazine 25 between its base 28 and its top wall 30 are a plurality of vertically spaced trays 31, the trays being disposed within the magazine 25 so that the front of the tray carrying a backing 32 is adjacent the door 19 of the frame 18 with the opposite end of the tray adjacent the end of the magazine 25 remote from the door 19 of the frame 18.

Slidably supported upon each tray 31 is a pliable carrier sheet 34 which is adapted to support thereon a plurality of rows of butter and the like in patty form, as shown in FIGURE 2. Projecting from one end of each of the carrier sheets 34 are attaching means embodying eyes 35 arranged in spaced relation therealong. The carrier sheets 34 are disposed upon the trays 31 so that the attaching means or eyes 35 are remote from the backings 32 of the trays 31 with the ends of the carrier sheets 34 opposite the attaching means or eyes 35 adjacent the backings 32, the attaching means or eyes 35 of the carrier sheets 34 being received in and embraced by channels 36 provided in the frame 18.

A first conveyor 40 is disposed within the cabinet 10 and has a horizontal run which is in alignment with and travels in a direction toward and discharges out of the exit opening 12 of the cabinet 10. The conveyor 40 is an endless belt which is driven by a first roller 41 secured to a first driven shaft 42. The shaft 42 has thereon a sprocket 43 which is drivingly connected to a sprocket 44 on a second driven shaft 45 by means of a chain belt 46, the shaft 45 being driven from the drive shaft 47 of a motor 48 by means of a bevel gear 49 on the drive shaft 47 in meshing engagement with a bevel gear 50 also secured to the shaft 45.

A second conveyor 52 is disposed within the cabinet 10 between the magazine 25 and the first conveyor 40 and has a substantially horizontal run below and contiguous to a tray 31 of the magazine 25, the latter run traveling in a direction from the magazine 25 toward and discharging onto the run of the first conveyor 40. The conveyor 52 is in the form of an endless belt which is driven by a second roller 53, secured to a third driven shaft 54. The third driven shaft 54 has thereon a spur gear 55 which has on a face thereof a sector gear 58 which is in mesh with a bevel gear 56 for a portion of each rotation of the spur gear 55. The third driven shaft 54 is drivingly connected to the drive shaft 47 by means of a sector gear 59 which gear is in mesh with the spur gear 55 for a portion of each rotation of the shaft 47. It is to be noted that the two lower driven shafts 27 are drivingly connected together by a crossed drive chain 57 or spur gear train, not shown.

The gearing for operating the second conveyor 52 and effecting the upward movement of the flexible belts 22 is such that the number of rotations of the sector gear 59 is dependent upon the number of rows of patties on the carrier sheet 34. During the rotations of the sector gear 59 it intermeshes with the spur gear 55 to cause the run of the second conveyor 52 to travel its entire course in corresponding number of stages. Immediately after the carrier sheet 34 has been withdrawn from the magazine 25 the sector gear 58 on the spur gear 55 meshes with the bevel gear 56 to cause the magazine 25 to move upward and to shift the tray 31 from which the carrier sheet 34 has been withdrawn out of cooperative relation with respect to the run of the second conveyor 52 and elevate the next underneath tray 31 carrying a carrier sheet 34 into cooperative relation with the run of the second conveyor 52.

On the cabinet 10 is a means which applies a pushing force to the tray 31 adjacent thereto and projects the end of the carrier sheet 34 carrying the attaching means or eyes 35 of the carrier sheet supported on such tray over the run of the second conveyor 52. Specifically, this means comprises a spring-biased roller 60 which is mounted on the frame 18 adajacent the door 19 by means of a pair of spaced brackets 62 which are carried by the frame 18, the brackets being swingably supported at their upper ends, as at 63, for movement from an operative position extending over the open end of the support 18 when the door 19 is closed, as shown in full lines in FIGURE 4 to an inoperative position outwardly and upwardly from the open end of the support 18 when the door 19 is open, as shown in phantom lines in FIGURE 4.

The door 19 of the frame 18 is provided with a latch element 65 which is releasably engageable with a keeper 66 on the adjacent part of the frame 18 for holding the door 19 in closed position, as shown in FIGURE 11.

The portion of the first conveyor 40 discharging out of the exit opening 12 of the cabinet 10 carrier a jerky movable receivable and guiding element or star wheel 70, the star wheel being operatively connected to the first conveyor 40 for positively depositing the received patties, without sticking, to conveyor 40 after it passes around roller 41, onto a receptacle disposed below and in alignment with the exit opening 12. The first driven shaft 42 carries a gear 71 which meshes with an idler gear 72, the idler gear being in mesh with a gear 73 on a fourth driven shaft 74. Circumposed about and connected to the fourth driven shaft 74 for movement therewith is a star wheel 70. The fourth driven shaft 74 has on one end a head 75 and circumposed about the portion of the shaft 74 between the head 75 and the gear 73 is a torsion spring 76 whose ends are attached to the head 75 and gear 73 respectively. Mounted on the frame 18 adjacent the inner face of the star wheel 70 is a spring detent 77. Rotation of the gear 73 causes the spring 76 to be wound until the force produced by the torsion spring is greater than the force exerted by the spring detent 77, then the detent is released from the star wheel, permitting the star wheel to rotate to an extent until the spring detent 77 engages another tooth on the star wheel 70. This rotation of the star wheel 80 imparts a jerky movement to the star wheel.

Securing means embodying hooks 80 are on the second conveyor 52, the hooks being arranged in spaced relation therealong. The hooks 80 are so spaced that the distance between adjacent hooks 80 corresponds to the length of a carrier sheet 34 excluding an attaching eye 35 so that a continuous flow of patties is deposited on to the second conveyor 52. This spacing enables the hooks 80 to interengage the eye 35 of the projected end of the adjacent carrier sheet 34 and connect the carrier sheet to the horizontal run of the second conveyor 52 for movement therewith to thereby cause the carrier sheet 34 to travel out of the magazine 25 and along the run of the second conveyor 52, to be guided about the discharge end of the run of the second conveyor 52, and be discharged between the second conveyor 52 and the first conveyor 40 into the interior of the cabinet 10.

A deflector 82 is on the side of the first conveyor 40 nearest to the discharge end of the run of the second conveyor 52 for directing the patties from the carrier sheet 34 onto the first conveyor 40.

Positioned exteriorly of the cabinet 10 and on one side of the exit opening 12 is an actuator 81 operatively connected to a spring-biased actuating rod 83 for operating a normally open snap switch 84 adjacent the free end of the rod 83. Application of force to the actuator 81 moves the rod 83 inwardly and into engagement with the normally open snap switch 84 and moves the latter to closed position, release of force upon the actuator 81 permitting the actuator 81 to return to its normal open position.

Referring to FIGURE 10, the leads 89 and 91 represent electrical energy supply leads, the lead 89 connecting to the normally open switch 84, and also included in the lead 89 is a normally closed switch 85. Another lead 91 extends to the motor 48, and a lamp 88 is electrically connected to the lead 91 and the lead 89 by means of leads 92 and 93. A lead 94 including a normally open switch 86 connects the lead 89 to a lamp 87, the lamp 87 being connected to the lead 91 by lead 95.

In operation, a receptacle is placed beneath the exit opening 12, and force is applied to the actuator 81, resulting in the actuator rod 83 closing the switch 84, resulting in the connection of the carrier sheet 34 adjacent the run of the second conveyor 52 with the latter run for movement therewith by interengagement of a hook 80 with an eye 35 on the projected end of the carrier sheet 34 and travel of the sheet out of the magazine 25 and along the second conveyor run until the row of butter patties adjacent the eyes 35 is discharged onto the first conveyor 40 and guided onto the latter conveyor by the deflector 82 and the next succeeding row of patties is brought into position for discharge onto the first conveyor 40. As the patties of the first row are deposited upon the first conveyor 40 this conveyor conveys such patties therealong and discharges same, one-by-one, onto the star wheel 70 and thence, onto the receptacle. With the release of force upon the actuator 81 the actuator rod 83 returns to its normal position under the action of the associated spring, and restores the snap switch 84 to open position. The application and release of force to the actuator 81 is continued successively until the patties of the final row are discharged onto the first conveyor 40. Following the discharge of the final row of patties on the carrier sheet 34 from the magazine 25 onto the second conveyor 52, the magazine 25 is elevated to the extent to bring the next underneath tray 31 and associated carrier sheet 34 in position for travel with the run of the second conveyor 52. As the magazine 25 executes this upward movement the spring-biased roller 60 moves into engagement with registering serrations 33 on the side walls 29 of the magazine 25 and applies a pushing force to the backing 32 of the tray 31 to project the end carrying the eyes 35 of the associated carrier sheet 34 over the run of the second conveyor 52.

This operation is continued in sequence until all of the carrier sheets 34 have been withdrawn from the magazine 25 and the patties supported thereon have been discharged from the exit opening 12 and onto the receptacle disposed below said opening. When the magazine 25 has executed its entire upward movement, the top 30 bears against the normally closed switch 85 and closes the normally open switch 86, resulting in the illumination of the lamp 87 to serve warning that the magazine 25 is nearly empty. Since the actuator on snap switch 86 is longer than that on the snap switch 85, the snap switch 86 closes before the snap switch 85 opens. So, when the snap switch 85 opens the magazine 25 is empty and all of the butter contained wtherein has been deposited on the first conveyor 40, thereby shutting off the supply of electrical energy to the motor 48.

It is to be noted that the deflector 82 is notched, and because of this notching the hooks 80 on the second conveyor 52 are permitted to pass the deflector 82, without interference.

As the trailing end of the carrier sheets 34 in turn pass under the deflector 82, the eyes 35 become unhooked from the hooks 80, permitting the sheets to pass between the second conveyor 52 and the frame 18 supporting the first conveyor 40 into the interior of the cabinet and collect upon the floor of the cabinet adjacent the door 13.

When the magazine 25 is empty, the doors 14 and 13 of the cabinet 10 are opened, and empty carrier sheets 34 withdrawn through the door 13. The operator then, through the door 14, swings the door 19 to open position, shifting the bar 60 to the position free of the opening closed by the door 19, disconnects the follower 20 from the belts 22, replaces the empty magazine by a loaded magazine 25 and shifts the loaded magazine 25 to its lowermost position, connects the follower 20 to the belts 22, swings the roller 60 into position within the opening closed by the door 19, and closes the door 19, thereby causing the roller 60 to be received in the uppermost registering serrations 33 in the side walls 29 of the magazine 25 and applies a pushing force to the backing 32 of the adjacent tray 31. Of course, the shifting of the magazine 25 to its lowermost position restores the switch 86 to its normal open position and extinguishes the lamp 87.

What is claimed is:

1. An apparatus for disensing butter and the like, comprising a cabinet having a side wall provided with an exit opening, an upstanding magazine disposed within said cabinet to one side of and spaced from said exit opening and connected to said cabinet for upward movement, said magazine comprising a plurality of trays arranged in superimposed spaced relation, a pliable carrier sheet slidably supported on each tray and adapted to support thereon a plurality of rows of butter and the like in patty form, a first conveyor disposed within said cabinet and having a horizontal run in alignment with and traveling in a direction toward and discharging out of said exit opening, a second conveyor disposed within said cabinet between sad magazine and said first conveyor and having a substantially horizontal run below and contiguous to a tray of said magazine and traveling in a direction from said magazine toward and discharging onto the run of said first conveyor, attaching means on the end of each carrier sheet adjacent said second conveyor run, means on said cabinet applying a pushing force to the tray adjacent thereto and projecting the end of the carrier sheet carrying the attaching means of the carrier sheet supported on the tray over said second conveyor run, and securing means on said second conveyor releasably interengageable with the attaching means on the projecting end of said carrier sheet and connecting said carrier sheet to said second conveyor run for movement therewith to thereby cause said carrier sheet to travel out of said magazine and along the second conveyor run, be guided about the discharge end of said run, and be discharged between said second conveyor run and said first conveyor into the interior of said cabinet.

2. The apparatus according to claim 1 which includes in addition a jerky movable receiving and guiding element at the portion of said first conveyor discharging out of said exit opening and operatively connected to said first conveyor for positively depositing the received patties without sticking onto a receptacle disposed below and in alignment with said exit opening.

3. The apparatus according to claim 2 wherein said element comprises a star wheel rotatable with a jerky motion.

4. The apparatus according to claim 1 wherein said attaching means embodies a plurality of eyes projecting in spaced relation from the end of each of the carrier sheets adjacent said second conveyor run, and said securing means on said second conveyor releasably interengageable with said attaching means embodies a plurality of hooks projecting in spaced relation from said second conveyor.

5. The apparatus according to claim 1 wherein each tray has a backing at the front end and wherein said pushing force means is applied to the backing of the adjacent tray.

6. The apparatus according to claim 5 wherein said pushing force applying means embodies a spring-biased roller carried by said cabinet and engageable with serrations formed on the end of said magazine adjacent the backings of said trays, the serrations being disposed so that a serration is between adjacent trays, said roller being operable to successively engage the serrations responsive to upward movement of said magazine.

7. An apparatus for dispensing butter and the like, comprising a cabinet having a side wall provided with an exit opening, an upstanding magazine disposed within sad cabinet to one side of and spaced from said exit opening and connected to said cabinet for upward movement, said magazine comprising a plurality of pliable carrier sheets slidably supported thereon and each adapted to support thereon a plurality of rows of butter and the like in patty form, a first conveyor disposed within said cabinet and having a horizontal run in alignment with and traveling in a direction toward and discharging out of said exit opening, a second conveyor disposed within said cabinet between said magazine and said first conveyor and having a substantially horizontal run below and contiguous to a tray of said magazine and traveling in a direction from said magazine toward and discharging onto the run of said first conveyor, attaching means on the end of each carrier sheet adjacent said second conveyor run, means on said cabinet applying a pushing force to the sheet adjacent thereto and projecting the end of the carrier sheet carrying the attaching means of the carrier sheet supported on the tray over said second conveyor run, and securing means on said second conveyor releasably interengageable with the attaching means on the projecting end of said carrier sheet and connecting said carrier sheet to said second conveyor run for movement therewith to thereby cause said carrier sheet to travel out of said magazine and along the second conveyor run, be guided about the discharge end of said run, and be discharged between said second conveyor run and said first conveyor into the interior of said cabinet.

8. The apparatus according to claim 7 wherein said pushing force applying means embodies a spring-biased roller carried by said cabinet and engageable with an adjacent end of said sheets.

References Cited in the file of this patent

UNITED STATES PATENTS

| 510,626 | Zeller | Dec. 12, 1893 |
| 1,683,779 | Horstkotte | Sept. 11, 1928 |
| 2,281,191 | Eddy et al. | Apr. 28, 1942 |